United States Patent
Chen et al.

(10) Patent No.: US 11,546,495 B2
(45) Date of Patent: Jan. 3, 2023

(54) CAMERA MODULE WITH A REFLECTOR MOUNTED IN A DISPLAY DEVICE

(71) Applicants: Beijing BOE Optoelectronics Technology Co., Ltd., Beijing (CN); BOE Technology Group Co., Ltd., Beijing (CN)

(72) Inventors: Zhiyong Chen, Beijing (CN); Haiwei Sun, Beijing (CN); Jian Sang, Beijing (CN); Zhihui Zeng, Beijing (CN); Lu Yu, Beijing (CN); Heling Zhu, Beijing (CN); Zhiyuan Wang, Beijing (CN); Wei Gong, Beijing (CN); Jinpeng Li, Beijing (CN); Zongying Shu, Beijing (CN); Xiangyu Ji, Beijing (CN); Zhonghua Li, Beijing (CN)

(73) Assignees: Beijing BOE Optoelectronics Technology Co., Ltd., Beijing (CN); Beijing BOE Technology Development Co., Ltd., Beijing (CN)

(*) Notice: Subject to any disclaimer, the term of this patent is extended or adjusted under 35 U.S.C. 154(b) by 879 days.

(21) Appl. No.: 16/329,389

(22) PCT Filed: Sep. 3, 2018

(86) PCT No.: PCT/CN2018/103746
§ 371 (c)(1),
(2) Date: Feb. 28, 2019

(87) PCT Pub. No.: WO2019/080651
PCT Pub. Date: May 2, 2019

(65) Prior Publication Data
US 2021/0385362 A1 Dec. 9, 2021

(30) Foreign Application Priority Data
Oct. 23, 2017 (CN) .......................... 201710993841.0

(51) Int. Cl.
*H04N 5/225* (2006.01)
*G03B 17/12* (2021.01)
(Continued)

(52) U.S. Cl.
CPC .......... *H04N 5/2257* (2013.01); *G03B 17/12* (2013.01); *G03B 17/17* (2013.01); *G03B 29/00* (2013.01);
(Continued)

(58) Field of Classification Search
CPC ..................................................... G03B 17/17
See application file for complete search history.

(56) References Cited

U.S. PATENT DOCUMENTS

2003/0036365 A1* 2/2003 Kuroda ............... H04N 5/2254
455/575.1
2007/0041723 A1 2/2007 Gutierrez et al.
(Continued)

FOREIGN PATENT DOCUMENTS

CN 102692804 A 9/2012
CN 103744255 A 4/2014
(Continued)

OTHER PUBLICATIONS

First Office Action dated Feb. 20, 2019 corresponding to Chinese application No. 201710993841.0.
(Continued)

*Primary Examiner* — Gary C Vieaux
(74) *Attorney, Agent, or Firm* — Nath, Goldberg & Meyer; Joshua B. Goldberg

(57) ABSTRACT

The present disclosure provides a camera module mounted in a display device, comprising: a lighting lens configured to collect light; a photoelectric sensor configured to convert the light collected by the lighting lens into a corresponding electrical signal; and a reflector arranged to be capable of reflecting the light from the lighting lens towards the photoelectric sensor.

13 Claims, 4 Drawing Sheets

(51) Int. Cl.
*G03B 17/17* (2021.01)
*G03B 29/00* (2021.01)
(52) U.S. Cl.
CPC ......... *H04N 5/2253* (2013.01); *H04N 5/2254* (2013.01)

(56) References Cited

U.S. PATENT DOCUMENTS

| | | | | |
|---|---|---|---|---|
| 2009/0002797 A1* | 1/2009 | Kwong | ................ | H04N 5/2259 359/225.1 |
| 2009/0128682 A1* | 5/2009 | He | ......................... | G03B 17/17 348/345 |
| 2013/0201289 A1* | 8/2013 | Billerbeck | ............ | G01S 7/4814 348/46 |
| 2018/0316835 A1* | 11/2018 | Files | .................... | H04N 5/2257 |

FOREIGN PATENT DOCUMENTS

| | | | |
|---|---|---|---|
| CN | 104635404 A | 5/2015 |
| CN | 107666566 A | 2/2018 |
| WO | 2017075099 A1 | 5/2017 |

OTHER PUBLICATIONS

International Search Report dated Nov. 19, 2018 corresponding to application No. PCT/CN2018/103746.

* cited by examiner

B-B

CAMERA MODULE WITH A REFLECTOR MOUNTED IN A DISPLAY DEVICE

CROSS-REFERENCE TO RELATED APPLICATION

This is a National Phase Application filed under 35 U.S.C. 371 as a national stage of PCT/CN2018/103746, filed on Sep. 3, 2018, an application claiming the benefit of Chinese Application No. 201710993841.0, filed on Oct. 23, 2017, the content of each of which is hereby incorporated by reference in its entirety.

TECHNICAL FIELD

The present disclosure relates to the field of display technologies, and in particular, to a camera module and a display device.

BACKGROUND

With the continuous development of science and technology, artificial intelligence (AI) has become the development trend in the future, and the camera module is one of the important structures to realize artificial intelligence. Therefore, a display device such as a laptop or a mobile phone integrates one or more camera modules, which makes it difficult to reduce the width of the frames of the display device.

SUMMARY

The present disclosure provides a camera module mounted in a display device, comprising: a lighting lens configured to collect light; a photoelectric sensor configured to convert the light collected by the lighting lens into a corresponding electrical signal; and a reflector arranged to be capable of reflecting the light from the lighting lens towards the photoelectric sensor.

Alternatively, the display device comprises a display module, the display module has a display surface, and the lighting lens does not overlap the display module in a direction perpendicular to the display surface; and the photoelectric sensor at least partially overlaps the display module in the direction perpendicular to the display surface.

Alternatively, a direction of the light reflected from the reflector to the photoelectric sensor is perpendicular to a light receiving surface of the photoelectric sensor.

Alternatively, the camera module further comprises a filter disposed between the lighting lens and the reflector for filtering out the light in a particular wavelength band.

Alternatively, the filter comprises a filter lens disposed between the lighting lens and the reflector.

Alternatively, the filter comprises a filter film layer disposed on a light receiving surface of the photoelectric sensor or disposed on a reflecting surface of the reflector.

Alternatively, a reflecting surface of the reflector is a mirror surface or a prism surface.

Alternatively, the lighting lens comprises a single lens or a plurality of lenses arranged coaxially.

Alternatively, the camera module further comprises a circuit board electrically connected to the photoelectric sensor for transmitting the electrical signal converted by the photoelectric sensor to an image processing module.

Alternatively, the photoelectric sensor and the reflector are configured to be mountable to a backplane of the display device.

Correspondingly, the present disclosure further provides a display device comprising: a display module and the camera module according to any one of claims 1 to 10, wherein the display module has a display surface, the lighting lens of the camera module does not overlap the display surface in a direction perpendicular to the display surface, the photoelectric sensor at least partially overlaps the display module in the direction perpendicular to the display surface, and the photoelectric sensor is located on a side of the display module that faces away from the display surface of the display module.

Alternatively, the display device further comprises a backplane, the backplane has a bottom wall opposite to the display panel and a side wall surrounding the display panel, a mounting groove is disposed on the side wall, and the camera module is fixedly disposed in the mounting groove.

Alternatively, the reflector is a reflective lens disposed on an inner wall of the mounting groove or a reflective film layer plated on the inner wall of the mounting groove.

Alternatively, the number of the camera modules is plural.

BRIEF DESCRIPTION OF THE DRAWINGS

The accompanying drawings are intended to provide a further understanding to disclosure and form part of the specification for explaining the disclosure in conjunction with the following specific embodiments, but are not intended to limit to the disclosure. In the drawings.

DETAILED DESCRIPTION OF THE EMBODIMENTS

The specific embodiments of the present disclosure will be described in detail below with reference to the accompanying drawings. It is to be understood that the specific embodiments described herein are for illustrative purposes only and are not intended to limit the disclosure.

Figure 1:
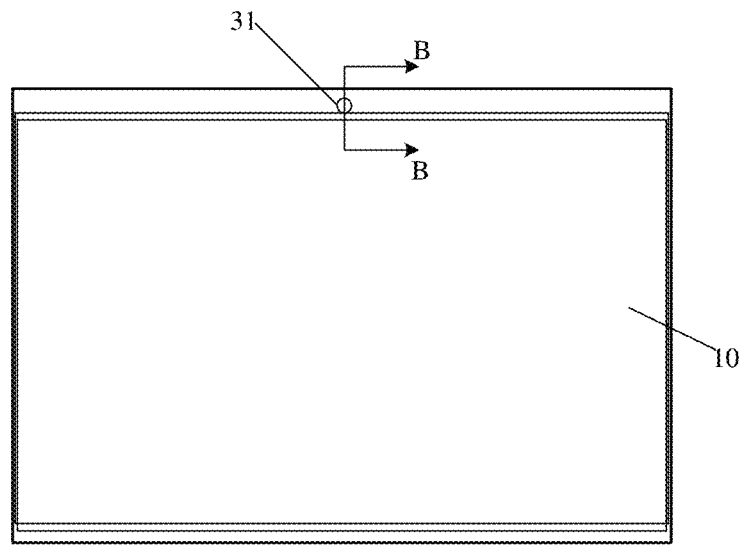
FIG. 1 is a front view of an embodiment of a display device integrated with a camera module.
Figure 2:
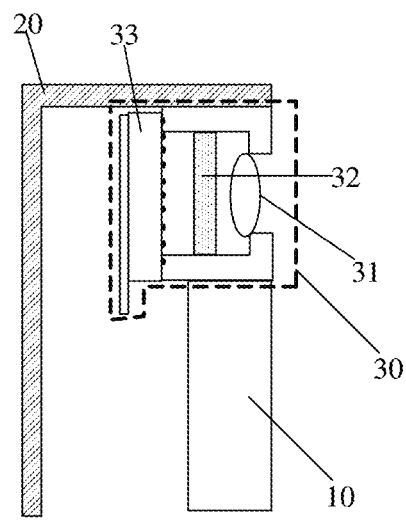
FIG. 2 is a cross-sectional view taken along line B-B of FIG. 1.

FIG. 1 is a front view of an embodiment of a display device integrated with a camera module; and FIG. 2 is a cross-sectional view taken along line B-B of FIG. 1. As shown in FIG. 1 and FIG. 2, the display device includes a display module 10, a backplane 20 and a camera module 30. A conventional camera module 30 adopts a straight down type structure, that is, a lighting lens 31, a filter 32, and a photoelectric sensor 33 are sequentially arranged in a thickness direction of the display device. Therefore, a frame size b of the display device such as a mobile phone or a laptop is currently mainly determined by the outline dimensions of the photoelectric sensor 33. Due to the limitations to the process conditions and the requirements to the imaging range, the photoelectric sensor 33 cannot be made small, which makes it difficult to reduce the width of the frames As an aspect of the present disclosure, a camera module 40 mounted in a display device is provided. As shown in FIG. 3 to FIG. 7, the display device includes a display module 10 having a display surface (a surface facing the user). The camera module 40 includes a lighting lens 41, a photoelectric sensor 42 and a reflector 43. The lighting lens 41 is configured to collect light; the photoelectric sensor 42 is configured to convert the light collected by the lighting lens 41 into a corresponding electrical signal; and a reflector 43 is arranged to be capable of reflecting the light from the lighting lens 41 towards the photoelectric sensor 42.

When the camera module 40 is mounted in the display device, the lighting lens 41 is disposed outside the display surface S. Specifically, when the display module 10 is in an upright state, the lighting lens 41 is located above, below, to the left or to the right of the reflector 43; and the display module 10 can block at least a part of the photoelectric sensor 42. In other words, the light path is a polyline, rather than a straight line. The light is collected by the lighting lens 41 and reflected by the reflector 43 to the photoelectric sensor 42. Therefore, the photoelectric sensor 42 does not need to be disposed between the display surface of the display module 10 and a top wall of the backplane of the display device. The frame of the display device is no longer limited by the size of the photoelectric sensor 42, but only related to the size of the lighting lens 41. Since the lighting lens 41 is relatively easy to realize a small size, thereby facilitating the realization of the narrow frame. In addition, if the light collected by the lighting lens 41 is directly incident on the photoelectric sensor 42, when the display module 10 blocks a part of the photoelectric sensor 42, it is necessary to increase the distance between the photoelectric sensor and the lighting lens 41, so as to allow the part of the photoelectric sensor 42 that is blocked by the display module 10 to receive light as well. However, this results in an increase in the thickness of the display device. In the present disclosure, since the reflector 43 can reflect the light to the photoelectric sensor 42, the angle of the reflector 43 can be set, so that the part of the photoelectric sensor 42 that is blocked by the display module 10 can also receive the light, thereby reducing the influence on the thickness of the display device. Therefore, the present disclosure can realize a narrow frame without affecting the thickness and the imaging function.

Alternatively, the lighting lens 41 does not overlap the display module 10 in a direction perpendicular to the display surface S, and the photoelectric sensor 42 at least partially overlaps the display module 10 in the direction perpendicular to the display surface S. In other words, the orthographic projection of the lighting lens 41 and the display module 10 on any plane parallel to the display surface S does not overlap with each other. In the display device, the display module 10 can block at least a part of the photoelectric sensor 43. Thereby, the narrow frame of the display device is facilitated to be realized.

Figure 3:
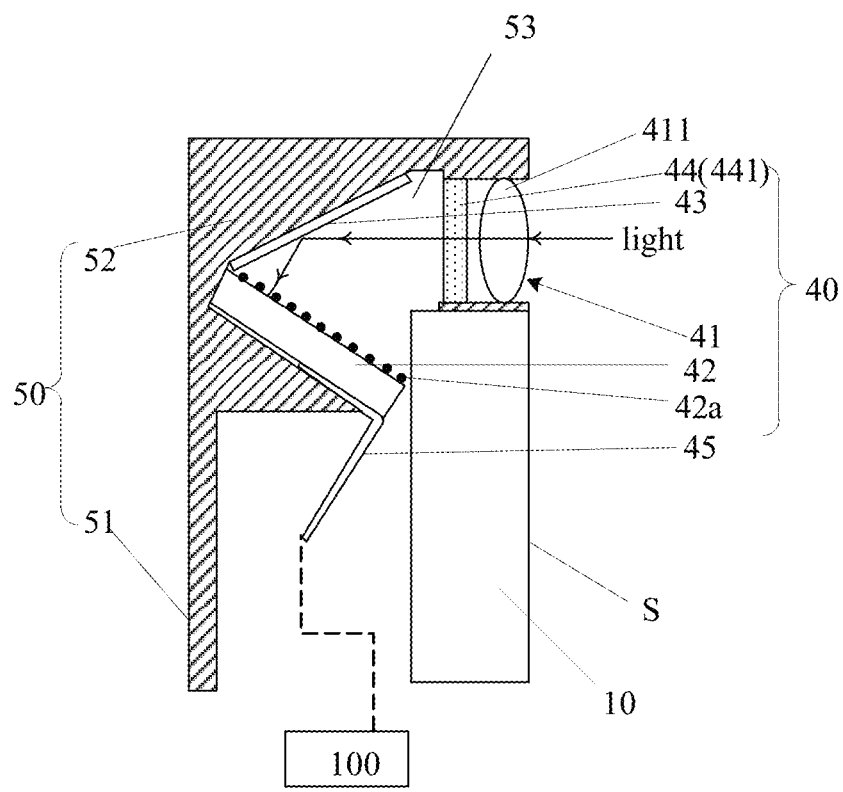
FIG. 3 is a schematic diagram of a first structure of a display device integrated with a camera module provided in the present disclosure.

Alternatively, in order to reduce the aberration of imaging, the direction of the light reflected from the reflector 43 to the photoelectric sensor 42 is perpendicular to a light receiving surface of the photoelectric sensor 42. In addition, in order to enable each pixel of the photoelectric sensor 42 to receive sufficient light for photoelectric conversion and imaging, as shown in FIG. 3, a micro-lens 42a is disposed at each pixel on the light receiving surface of the photoelectric sensor 42, so as to converge the light to the corresponding pixel.

In the present disclosure, the reflecting surface of the reflector 43 may specifically be a mirror surface, so as to specularly reflect the received light to the photoelectric sensor 42 directly; or the reflecting surface is a prism surface having a plurality of micro-prisms 43a formed by microstructure processing, so that the received light is reflected by the micro-prisms 43a multiple times and then reflected to the photoelectric sensor 42.

Figure 7:
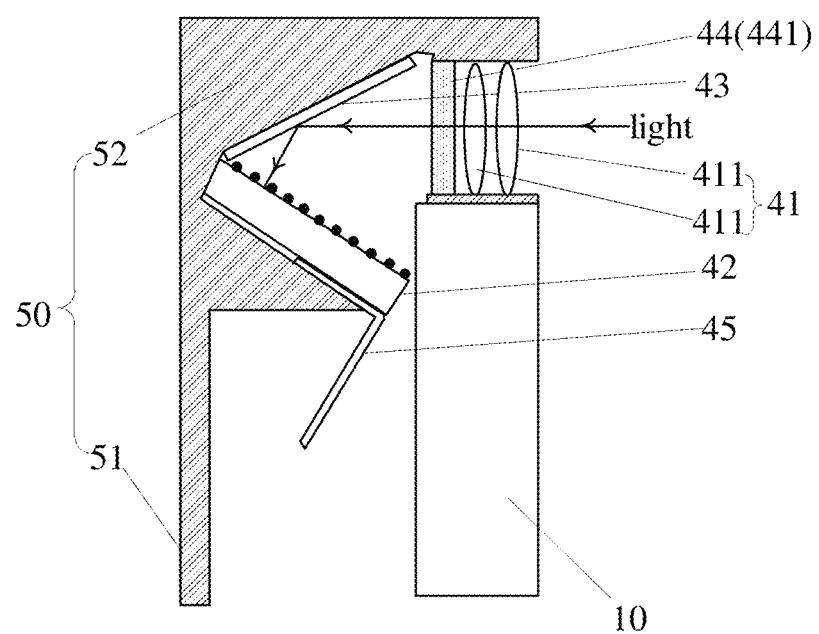
FIG. 7 is a schematic diagram of a fifth structure of a display device integrated with a camera module provided in the present disclosure.

As shown in FIG. 7, the lighting lens 41 may include a single lens 411, or may also include a plurality of lenses 411 disposed coaxially, which may be specifically set according to actual shooting requirements.

Further, the camera module may include a filter 44 disposed between the lighting lens 41 and the reflector 43 for filtering out the light in a particular wavelength band. Therefore, when imaging is performed, the light in a particular wavelength band (for example, infrared light) is removed, and visible light is retained, so that the formed image is consistent with the image seen by the human eyes. Definitely, the filter 44 can also be provided to filter out the light in other wavelength bands (for example, blue light).

Figure 6:
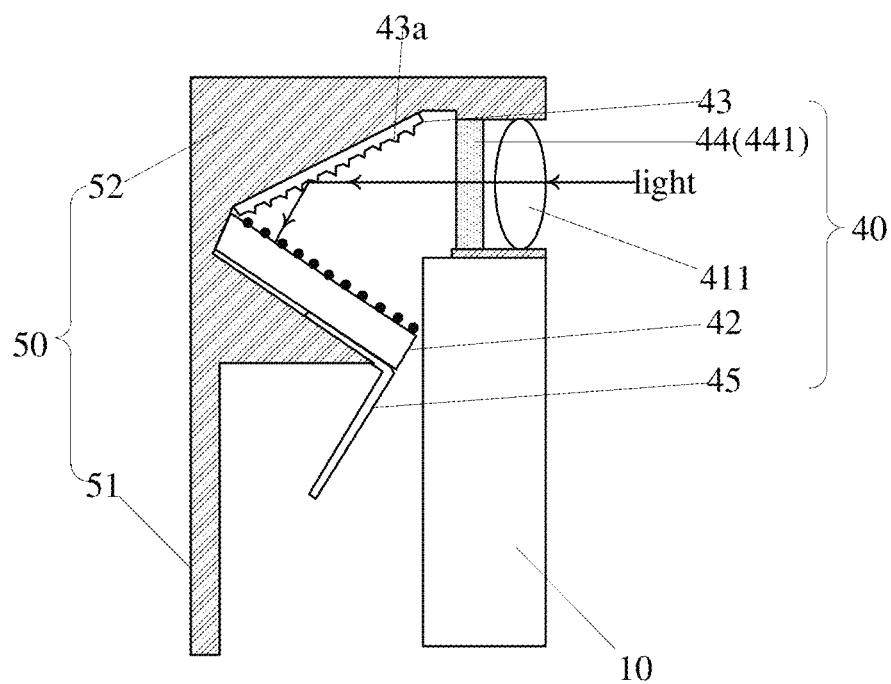
FIG. 6 is a schematic diagram of a fourth structure of a display device integrated with a camera module provided in the present disclosure.

The first specific structure of the filter 44 is as shown in FIGS. 3, 6, and 7, and includes a filter lens 441 disposed between the lighting lens 41 and the reflector 43. Such arrangement has lower requirements for the manufacturing process and can effectively save costs.

Figure 4:
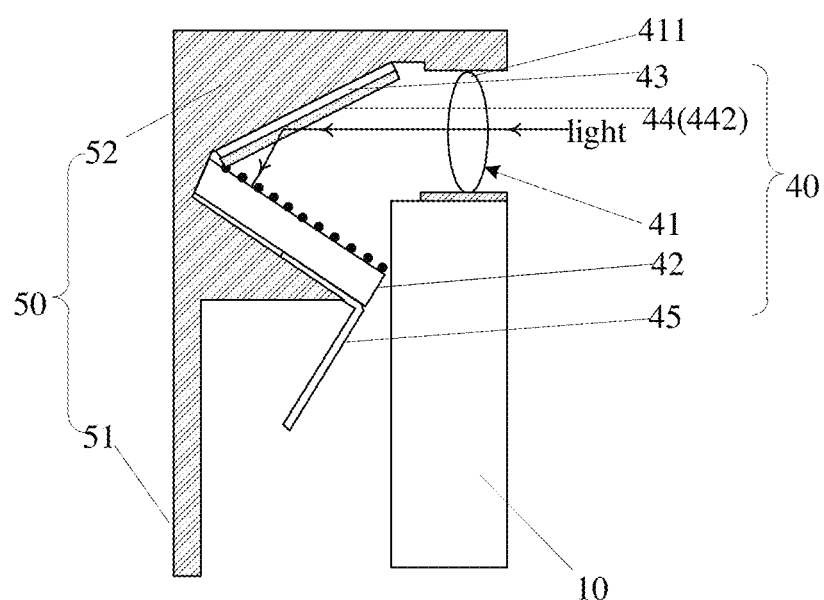
FIG. 4 is a schematic diagram of a second structure of a display device integrated with a camera module provided in the present disclosure.
Figure 5:
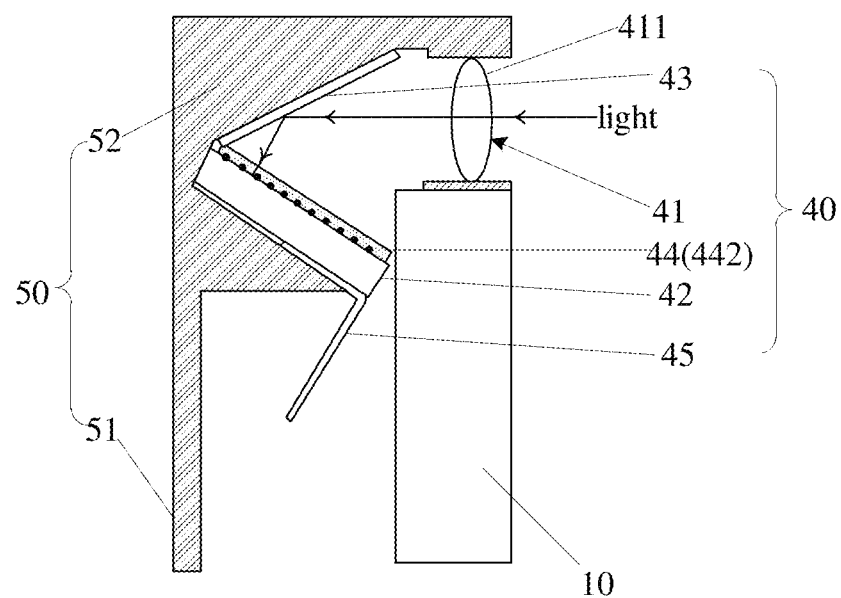
FIG. 5 is a schematic diagram of a third structure of a display device integrated with a camera module provided in the present disclosure.

The second specific structure of the filter 44 is as shown in FIGS. 4 and 5, and includes a filter film layer 442 disposed on the light receiving surface of the photoelectric sensor 42 (as shown in FIG. 5) or disposed on the reflecting surface of the reflector 43 (as shown in FIG. 4). Such arrangement makes the structure of the camera module more compact.

Further, the camera module 40 may also include a circuit board 45 electrically connected to the photoelectric sensor 42 for transmitting the electrical signal converted by the photoelectric sensor 42 to an image processing module 100, so that the image processing module 100 generates a image based on the electrical signal.

Alternatively, the photoelectric sensor 42 and the reflector 43 are configured to be mountable to the backplane 50 of the display device. The camera module 40 can be mounted as an integral to the backplane 50 of the display device. For example, the reflector 43 is joined to a side wall 52 of an upper portion of the backplane 50 while the photoelectric sensor 42 is joined to a protruding wall of a lower portion of the backplane 50. Thereby, the camera module 40 can be stably mounted in the display device, and the structural stability is good.

As another aspect of the present disclosure, a display device is provided. As shown in FIG. 3 to FIG. 7, the display device includes a display module 10 and the above-described camera module 40. The display module 10 has a display surface S. The lighting lens 41 of the camera module 40 does not overlap the display surface S in the direction perpendicular to the display surface S. In other words, the display module 10 does not block the lighting of the lighting lens 41, and the lighting lens 41 does not block the display screen of the display module 10. The photoelectric sensor 42 at least partially overlaps the display module 10 in the direction perpendicular to the display surface S, and the photoelectric sensor 42 is located on a side of the display module 10 that faces away from the display surface S thereof.

In the display device, the display module 10 can block at least a part of the photoelectric sensor 42, and the photoelectric sensor 42 is located on the side of the display module 10 that faces away from the display surface S thereof. Therefore, the frame of the display device is no longer limited by the size of the photoelectric sensor 42, but only related to the size of the lighting lens 41. Since the lighting lens 41 is relatively easy to realize a small size, thereby facilitating the realization of the narrow frame. Since the reflector 43 can reflect the light to the photoelectric sensor 42, the angle of the reflector 43 can be set, so that the part of the photoelectric sensor 42 that is blocked by the display module 10 can also receive the light, thereby reducing the influence on the thickness of the display device. Therefore, the present disclosure can realize a narrow frame without affecting the thickness and the imaging function.

The display device may be a product having a camera function, such as a mobile phone, a tablet computer, a display, a television, a laptop and the like.

The number of the camera modules 40 may be plural, which is beneficial to achieve effects such as wide-angle shooting, naked-eye 3D, depth-of-field assistance, and the like, and improve user experience.

Further, the display device further includes a backplane 50 disposed on the side of the display module 10 facing away from the display surface S thereof. The backplane 50 has a bottom wall 51 opposite to a display panel 10 and a side wall 52 surrounding the display panel 10, a mounting groove 53 is disposed on the side wall 52, and the camera module 40 is fixedly disposed in the mounting groove 53. As shown in FIG. 3, FIG. 6, and FIG. 7, the filter 44 is a filter lens 441, and the filter lens 441 and the lighting lens 41 are fixed in the openings of the groove by means of clipping. The reflector 43 is a reflective lens, and the reflective lens and the photoelectric sensor 42 are fixed on an inner wall of the mounting groove 53 by means of embedding and bonding. Definitely, the reflector 43, the photoelectric sensor 42, the filter, and the lighting lens 41 can also be fixed in the mounting groove 53 by other means. For example, the reflector 43 is a reflective film layer plated on the inner wall of the mounting groove 53.

The display module 10 of the present disclosure may be a liquid crystal display (LCD) module or an organic electroluminescence display module. When the display module 10 is a LCD module, the display device further includes a backlight module. The backlight module is disposed in a space defined by the side wall 52 and the bottom wall 51 of the backplane 50.

It is to be understood that the above embodiments are merely exemplary embodiments employed to explain the principles of the present disclosure, but the present disclosure is not limited thereto. Various modifications and improvements can be made by those skilled in the art without departing from the spirit and scope of the disclosure, and such modifications and improvements are also considered to be within the scope of the disclosure.

What is claimed is:

1. A camera module mounted in a display device, comprising:
   a lighting lens configured to collect light;
   a photoelectric sensor configured to convert the light collected by the lighting lens into a corresponding electrical signal; and
   a reflector arranged to be capable of reflecting the light from the lighting lens towards the photoelectric sensor,
   wherein the display device comprises a display panel, the display panel has a display surface, and the lighting lens does not overlap the display panel in a direction perpendicular to the display surface; and
   the photoelectric sensor at least partially overlaps the display surface of the display panel in the direction perpendicular to the display surface.

2. The camera module according to claim 1, wherein a direction of the light reflected from the reflector to the photoelectric sensor is perpendicular to a light receiving surface of the photoelectric sensor.

3. The camera module according to claim 1, further comprising a filter disposed between the lighting lens and the photoelectric sensor for filtering out the light in a particular wavelength band.

4. The camera module according to claim 3, wherein the filter comprises a filter lens disposed between the lighting lens and the reflector.

5. The camera module according to claim 3, wherein the filter comprises a filter film layer disposed on a light receiving surface of the photoelectric sensor or disposed on a reflecting surface of the reflector.

6. The camera module according to claim 1, wherein a reflecting surface of the reflector is a mirror surface or a prism surface.

7. The camera module according to claim 1, wherein the lighting lens comprises a single lens or a plurality of lenses arranged coaxially.

8. The camera module according to claim 1, further comprising a circuit board electrically connected to the photoelectric sensor for transmitting the electrical signal converted by the photoelectric sensor to an image processing module.

9. A display device comprising: a display panel and a camera module, wherein the camera module comprises:
   a lighting lens configured to collect light;
   a photoelectric sensor configured to convert the light collected by the lighting lens into a corresponding electrical signal; and
   a reflector arranged to be capable of reflecting the light from the lighting lens towards the photoelectric sensor,
   wherein the display panel has a display surface, the lighting lens of the camera module does not overlap the display panel in a direction perpendicular to the display surface, the photoelectric sensor at least partially overlaps the display panel in the direction perpendicular to the display surface, and the photoelectric sensor is located on a side of the display panel that faces away from the display surface of the display panel.

10. The display device according to claim 9, wherein the display device further comprises a backplane, the backplane has a bottom wall opposite to the display panel and a side wall surrounding the display panel, a mounting groove is disposed on the side wall, and the camera module is fixedly disposed in the mounting groove.

11. The display device according to claim 10, wherein the reflector is a reflective lens disposed on an inner wall of the mounting groove or a reflective film layer plated on the inner wall of the mounting groove.

12. The display device according to claim 9, wherein the number of the camera modules is plural.

13. The display device according to claim 9, wherein the photoelectric sensor and the reflector are mounted to a backplane of the display device.

* * * * *